United States Patent
Kodama et al.

(10) Patent No.: US 8,540,962 B2
(45) Date of Patent: Sep. 24, 2013

(54) METHOD FOR PRODUCING HYDROGEN BY MEANS OF THERMOCHEMICAL WATER-SPLITTING, AND DEVICE FOR PRODUCING HYDROGEN

(75) Inventors: Tatsuya Kodama, Niigata (JP); Nobuyuki Gokon, Niigata (JP)

(73) Assignee: Niigata University, Niigata (JP)

(*) Notice: Subject to any disclaimer, the term of this patent is extended or adjusted under 35 U.S.C. 154(b) by 0 days.

(21) Appl. No.: 13/511,333

(22) PCT Filed: Dec. 1, 2010

(86) PCT No.: PCT/JP2010/071485
§ 371 (c)(1),
(2), (4) Date: May 22, 2012

(87) PCT Pub. No.: WO2011/068122
PCT Pub. Date: Jun. 9, 2011

(65) Prior Publication Data
US 2012/0237440 A1 Sep. 20, 2012

(30) Foreign Application Priority Data
Dec. 3, 2009 (JP) .................... 2009-275837

(51) Int. Cl.
*C01B 3/10* (2006.01)
*B01J 8/42* (2006.01)

(52) U.S. Cl.
USPC ........... 423/658; 423/657; 422/139; 422/630

(58) Field of Classification Search
USPC ....................................... 423/653
See application file for complete search history.

(56) References Cited

U.S. PATENT DOCUMENTS

2005/0036940 A1* 2/2005 Grace et al. ............. 423/652
2010/0136442 A1* 6/2010 Abanades et al. ........ 429/421

FOREIGN PATENT DOCUMENTS

| JP | 11-21101 A | 1/1999 |
| JP | 2001270701 A | 10/2001 |
| JP | 2004269296 A | 9/2004 |
| JP | 2006248809 A | 9/2006 |

(Continued)

OTHER PUBLICATIONS

Stephane Abanades et al. Thermochemical hydrogen production from a two-step solar-driven water-splitting cycle based on cerium oxides Solar Energy, vol. 80(2006), pp. 1611-1623.*

(Continued)

*Primary Examiner* — Melvin C Mayes
*Assistant Examiner* — Douglas Call
(74) *Attorney, Agent, or Firm* — Duane Morris LLP; J. Rodman Steele, Jr.; Gregory M. Lefkowitz

(57) ABSTRACT

The disclosed method for producing hydrogen by means of thermochemical water-splitting can efficiently use solar energy obtained by means of a beam-down typed light collecting system. Further disclosed is a device for producing hydrogen. While circulating within a reactor (1) a fluidized bed (2) made of metal oxide particles, two reactions are simultaneously caused to proceed: a thermal reduction reaction, which is an oxygen evolution reaction wherein a portion of the fluidized bed (2) is heated by solar light (S) in a nitrogen atmosphere, which is a low oxygen partial pressure gas, releasing oxygen from the metal oxide; and a thermochemical water-splitting reaction, which is a hydrogen evolution reaction wherein water vapor is brought into contact with the metal oxide after oxygen has been released, generating hydrogen.

9 Claims, 7 Drawing Sheets

(56) References Cited

FOREIGN PATENT DOCUMENTS

| JP | 2009120432 A | | 6/2009 |
|---|---|---|---|
| WO | 2006027829 A1 | | 3/2006 |
| WO | WO/2008/113944 | * | 9/2008 |

OTHER PUBLICATIONS

N. Gokon, S. Takahashi, H. Yamamoto, T. Kodama Thermochemical two-step water-splitting reactor with internally circulating fluidized bed for thermal reduction of ferrite particles. International Journal of Hydrogen Energy; vol. 33(2008), pp. 2189-2199.*

Gokon et al., "Therrnochernical Two-Step Water-Splitting Reactor with internally Circulating Fluidize Bed for Thermal Reduction of Ferrite Particles", Internatlonal Journal of Hydrogen Energy 33 (2003), pp. 2189-2199.

Gokon et al., "Internally Circulating Fluidize Bed Reactor With NiFe2O4 Particles for Thermochemical Water-Splitting", SolarPaces (2009), pp. 1-13.

Gokon et al., "New Solar Water-Splitting Reactor with Ferrite Particles in an Internally Circulating Fluidize Bed", Journal of Solar Energy Engineering, Copyright 2009 by ASME, Feb. 2009, vol. 131 / 011007-1 to 011007-9.

Gokon et al., "Internally Circulating Fluidize Bed Reactor Using rn-Zro2 Supported NiFe2O4 Particles for Thermochemical Two-Step Water-Splitting", Journal of Solar Energy Engineering, Copyright 2010 by ASME, May 2010, vol. 132 / 21102-1 to 21102-10.

Kodama et al., "Solar Hydrogen Production by High-Temperature Solar Heat", Journal of JSES, 2009, vol. 35 No. 5 / 1-11.

Patent Cooperation Treaty; "International Search Report" mailed Dec. 28, 2010, by ISA/Japanese Patent Office, in PCT/JP2010/0710485, pp. 1-4.

* cited by examiner

METHOD FOR PRODUCING HYDROGEN BY MEANS OF THERMOCHEMICAL WATER-SPLITTING, AND DEVICE FOR PRODUCING HYDROGEN

CROSS-REFERENCE TO RELATED APPLICATIONS

This application is a §371 national stage entry of International Application No. PCT/JP2010/071485, filed Dec. 1, 2010, which claims priority to Japanese Patent Application No. JP2009-275837 filed Dec. 3, 2009, the entire contents of which are incorporated herein by reference.

TECHNICAL FIELD

The present invention relates to a method and device for producing hydrogen through thermochemical water-splitting using an internally circulating fluidized bed.

BACKGROUND ART

As a method for producing hydrogen through thermochemical water-splitting using a heat of not lower than 1,000° C. that is obtained by concentrating solar light, a two-step thermochemical water-splitting cycle using a metal oxide such as an iron oxide and a cerium oxide has been expected to become a promising one. Accordingly, institutes in various countries have worked on developing reactors for the two-step thermochemical water-splitting.

Inventors of the present invention once developed a solar reactor internally circulating iron-oxide particles and conducted an experiment with a prototype of the solar reactor (See, non-patent documents 1 to 5). The solar reactor, as shown in FIG. 8, includes a quartz window provided on the ceiling of the reactor and introduces solar light from the quartz window. Such solar light is downwardly concentrated by a beam-down typed light collecting system as a solar concentrating system. In the reactor, the solar light is irradiated onto the internally circulating fluidized bed made of metal oxide particles, thereby heating the particles. Further, the inventors also developed metal oxides used in the two-step thermochemical water-splitting (See, patent document 1).

The two-step thermochemical water-splitting using the metal oxides is performed by alternately repeating two reactions: one reaction is an oxygen evolution reaction which releases oxygen from the metal oxides in a high temperature of not lower than 1,400° C. under a low-oxygen partial pressure gas atmosphere such as nitrogen atmosphere; and the other reaction is a hydrogen evolution reaction which generates hydrogen by allowing the metal oxides with oxygen having been released therefrom to come into contact with water vapor in a low temperature of not higher than 1,400° C. The following reaction formulas express reactions of the oxygen and hydrogen evolution that occur when using $NiFe_2O_4$ as the metal oxide.

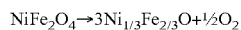

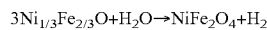

According to the conventional method using the solar reactor developed by the inventors of the present invention, a low-oxygen partial pressure gas such as nitrogen is at first flowed to a metal oxide particles bed within the solar reactor from the bottom of the metal oxide particles bed, thereby preparing an internally circulating fluidized bed. Next, the internally circulating fluidized bed is irradiated with concentrated solar light in order to heat the particles to 1,400° C. or higher, thus causing the oxygen evolution reaction. After that, the temperature of the particles is decreased to 1,400° C. or lower by reducing the aunt of the concentrated solar light introduced into the solar reactor, and the flowed gas from the bottom of the fluidized bed is switched to water vapor, thereby causing the hydrogen evolution reaction.

RELATED ART DOCUMENTS

Patent Document

Patent document 1: WO2006/027829 international publication pamphlet

Non-Patent Documents

Non-patent document 1: N. Gokon, N. Kondo, T. Mataga, T. Kodama, "Internally Circulating Fluidized Bed Reactor with NiFe2O4 Particles for Thermochemical Water-splitting", SolarPACES 2009, 15-18 Sep. 2009, Berlin, Germany.

Non-patent document 2: Tatsuya KODAMA, Nobuyuki GOKON, "Solar hydrogen production using high temperature solar heat", *Solar Energy*, Vol. 35, No. 5 (2009).

Non-patent document 3: N. Gokon, S. Takahashi, H. Yamamoto, T. Kodama, "New Solar Water-Splitting Reactor with Ferrite Particles in an Internally Circulating Fluidized Bed", ASME J. Sol. Energy Eng., 131 (2009) 011007.

Non-patent document 4: N. Gokon, S. Takahashi, H. Yamamoto, T. Kodama, "Thermochemical two-step water-splitting reactor with internally circulating fluidized bed for thermal reduction of ferrite particles", Int. J. Hydrogen Energy, 33 (2008) 2189-2199.

Non-patent document 5: N. Gokon, H. Yamamoto, N. Kondo, T. Kodama, "Internally Circulating Fluidized Bed Reactor Using m-ZrO2 Supported NiFe2O4 Particles for Thermochemical Two-Step Water Splitting", J. Sol. Energy Eng., 132 (2010) 021102.

DISCLOSURE OF THE INVENTION

Problems to be Solved by the Invention

However, the conventional method had the following problems.

1. It is required to increase or decrease the amount of the concentrated solar light to be introduced into the solar reactor when alternately switching between the two-step reactions. For this reason, it is impossible to always fully utilize the solar heat obtained by the beam-down typed light collecting system, thus decreasing usage efficiency of solar energy.

2. It is required to cool and reheat the whole reactor every time the two reactions having different reaction temperatures are switched therebetween, and thus this temperature alteration of the whole solar reactor results in one of the factors which reduce energy efficiency. That is, switching from the oxygen evolution reaction to the hydrogen evolution reaction results in heat release due to the cooling of the whole reactor, thereby increasing heat loss of the reactor. Further, switching from the hydrogen evolution reaction to the oxygen evolution reaction involves reheating of the whole reactor, thereby requiring a large amount of heat. Therefore, cooling and reheating of the whole reactor due to the switching between the reactions causes thermal efficiency of the reactor to decrease.

3. The two-step reaction is conducted by alternately repeating the two reactions: one reaction is the oxygen evolution reaction that releases oxygen from the metal oxide in the high temperature of not lower than 1,400° C.; and the other reaction is the hydrogen evolution reaction that generates hydrogen by allowing the metal oxide with oxygen having been released therefrom to react with water vapor in the low temperature of not higher than 1,400° C. When switching from the oxygen evolution reaction to the hydrogen evolution reaction, a large amount of sensible heat is released as a result of cooling reactant particles of the metal oxide. However, since the reactions are alternately switched, the heat thus released cannot be used to reheat the reactant particles in the hydrogen evolution reaction coming after the oxygen evolution reaction.

4. The whole reactor and the whole reactant particles need to be heated to two different temperatures every time the two-step reaction is repeated. Therefore, a gas released from the reactor has an unstable temperature. Thus, the gas cannot be continuously taken out at a constant temperature. As a result, it is troublesome when utilizing waste heat of the gas released from the reactor.

5. Every time the two-step reaction is repeated, it is required to change the temperature of the whole reactor and the whole reactant particles to two different temperatures and also to replace the whole gas within the reactor at the same time. It takes time to change the temperatures of the reactor and the whole reactant particles and so does it to replace the whole gas filled in the reactor. Thus, the reaction is stopped or retarded during the change of the temperature and the replacement of the gas, thereby decreasing the operating efficiency of the reactor.

6. Every time the two-step reaction is switched, it is required to switch gases to be introduced into the reactor and to replace the whole gas filled in the reactor, thus making the operation of the reactor troublesome.

7. The hydrogen evolution reaction is an exothermic reaction, and the oxygen evolution reaction is an endothermic reaction. However, since these reactions are alternately switched, a reaction heat generated by the hydrogen evolution reaction cannot be utilized as heat to heat a gas acrd particles in the oxygen evolution reaction, or as a heat source of the endothermic reaction.

In view of the above problems, it is an object of the present invention to provide a method and device for producing hydrogen by means of thermochemical water-splitting where solar energy obtained by a beam-down typed light collecting system can be highly efficiently utilized.

Means of Solving the Problems

In order to achieve the above object, the inventors of the present invention studied various things by using a solar reactor having an internally circulating fluidized bed made of iron oxide particles. As a result, the inventors found that temperatures were very different at different positions of the fluidized bed within the reactor while conducting the oxygen evolution reaction. That is, in an upper portion of a draft tube placed at the center of the fluidized bed in order to create an internally circulating fluid, some parts of the fluidized bed became higher temperature because concentrated solar light was directly received, thereby mainly progressing the oxygen evolution reaction. On the other hand, at the same time, a temperature of the lower portion of the fluidized bed was lower. Because of these, the inventors found that there was a possibility to mainly conduct the hydrogen evolution reaction by introducing water vapor to the lower portion thereof. In this way, the inventors finally completed the present invention by enthusiastically studying to use this phenomenon within the solar reactor haying the internally circulating fluidized bed.

A method for producing hydrogen by means of thermochemical water-splitting as set forth in a first aspect includes simultaneously progressing an oxygen evolution reaction and a hydrogen evolution reaction while a fluidized bed comprising particles of a metal oxide is circulated within a solar reactor. The oxygen evolution reaction releases oxygen from the metal oxide by heating a part of the fluidized bed by solar light under a low-oxygen partial pressure gas atmosphere and the hydrogen evolution reaction releases hydrogen by allowing the metal oxide with oxygen having been released therefrom to come into contact with water vapor.

A method for producing hydrogen by means of thermochemical water-splitting as set forth in a second aspect includes simultaneously progressing an oxygen evolution reaction and a hydrogen evolution reaction while a fluidized bed comprising particles of a metal oxide is circulated within a solar reactor. The oxygen evolution reaction releases oxygen from the metal oxide by heating a part of the fluidized bed by solar light to not lower than 1.400° C. under a low-oxygen partial pressure gas atmosphere and the hydrogen evolution reaction releases hydrogen by allowing the metal oxide with oxygen having been released therefrom to come into contact with water vapor in a temperature of not higher than 1,400° C.

According to a method for producing hydrogen by means of thermochemical water-splitting as set forth in a third aspect, the metal oxide is ferrite or ferrite-supported zirconia.

According to a method for producing hydrogen by means of thermochemical water-splitting as set forth in a forth aspect, the zirconia is any of monoclinic zirconia, cubic zirconia and tetragonal zirconia, and the cubic zirconia contains any of yttria, calcia and magnesia as a stabilizer.

According to a method for producing hydrogen by means of thermochemical water-splitting as set forth in a fifth aspect, the metal oxide is nickel-ferrite or nickel-ferrite-supported monoclinic zirconia.

According to a method for producing hydrogen by means of thermochemical water-splitting as set forth in a sixth aspect, the metal oxide is cerium-oxide or cerium-oxide-supported zirconia.

According to a method for producing hydrogen by means of thermochemical water-splitting as set forth in a seventh aspect, particle sizes of the metal oxide particles are in a range of 200 to 750 µm.

According to a method for producing hydrogen by means of thermochemical water-splitting as set forth in an eighth aspect, the low-oxygen partial pressure gas is nitrogen or argon.

A device for producing hydrogen by means of thermochemical water-splitting as set forth in a ninth aspect includes: a solar reactor storing a fluidized bed comprising metal oxide particles; a solar light concentration means concentrating and irradiating solar light onto the fluidized bed stored within the solar reactor; a low-oxygen partial pressure gas introduction means introducing a low-oxygen partial pressure gas into the fluidized bed; and a water vapor introduction means introducing water vapor into the fluidized bed.

A device for producing hydrogen by means of thermochemical water-splitting as set forth in a tenth aspect includes: a solar reactor storing a fluidized bed including metal oxide particles; a solar light concentration means concentrating and irradiating solar light onto an upper central portion of the fluidized bed stored within the solar reactor. The solar reactor includes: a cylindrical draft tube that is open in a top and bottom direction, buried into the fluidized bed, and arranged in a center portion of the fluidized bed; a low-oxygen partial pressure gas introduction means introducing a low-oxygen partial pressure gas into an inside of the draft tube from a lower portion of the draft tube; a water vapor introduction means introducing water vapor into an outside of the draft tube from the lower portion of the draft tube; and a gas separation means separating a gas upwardly released from the inside of the draft tube and a gas upwardly released from the outside of the draft tube.

According to a device for producing hydrogen by means of thermochemical water-splitting as set forth in an eleventh aspect, the solar reactor includes a quartz window on an upper portion thereof so as to transmit the solar light therethrough.

According to a device for producing hydrogen by means of thermochemical water-splitting as set forth in a twelfth aspect, the metal oxide is ferrite or ferrite-supported zirconia.

According to a device for producing hydrogen by means of thermochemical water-splitting as set forth in a thirteenth aspect, the zirconia is any of monoclinic zirconia, cubic zirconia and tetragonal zirconia, and the cubic zirconia contains any of yttria, calcia and magnesia as a stabilizer.

According to a device for producing hydrogen by means of thermochemical water-splitting as set forth in a fourteenth aspect, the metal oxide is nickel-ferrite or nickel-ferrite-supported monoclinic zirconia.

According to a device for producing hydrogen by means of thermochemical water-splitting as set forth in a fifteenth aspect, the metal oxide is cerium-oxide or cerium-oxide-supported zirconia.

According to a device for producing hydrogen by means of thermochemical water-splitting as set forth in a sixteenth aspect, particle sizes of the metal oxide particles are in a range of 200 to 750 µm.

According to a device for producing hydrogen by means of thermochemical water-splitting as set forth in a seventeenth aspect, the low-oxygen partial pressure gas is nitrogen or argon.

Effects of the Invention

According to a method for producing hydrogen by means of thermochemical water-splitting of the present invention, energy conversion ratio can be enhanced by the fact that the following changes for an amount of concentrated solar light to be introduced into the reactor, introducing gases, and temperatures due to the switching of the two-step reactions become unnecessary because the two reactions of oxygen evolution reaction and hydrogen evolution reaction are simultaneously progressed in different areas within the reactor by using a temperature difference which is generated by heating an internally circulating fluidized bed by irradiation of solar light from above and between the upper portion and lower portion of the fluidized bed within the solar reactor. Further, the operation of the reactor can be simplified. Furthermore, during the switching of the two reactions, the progression of the reactions is not stuck, so that operating efficiency of the reactor increases.

Moreover, according to a device for producing hydrogen by means of thermochemical water-splitting of the present invention, oxygen and hydrogen can be simultaneously produced by the fact that the oxygen evolution reaction is progressed on the upper surface of the internally circulating fluidized bed and the hydrogen evolution reaction is simultaneously progressed in the lower portion of the fluidized bed while solar light is concentrated and irradiated onto the upper surface of the fluidized bed as well as circulating the fluidized bed within the reactor.

In short, the present invention can solve the problems of the conventional art as follows.

1. Since two reactions are simultaneously progressed in different areas within the reactor by using a temperature difference which is generated by heating the internally circulating fluidized bed by irradiation of solar light from above and between the upper portion and lower portion of the fluidized bed within the solar reactor, the amount of the concentrated solar light to be introduced into the reactor can be constant, thereby becoming unnecessary to increase and decrease the amount of the concentrated solar light. In this way, a full of solar heat obtained by the beam-down typed light collecting system can be always utilized, thus increasing usage efficiency of solar energy.

2. The two reactions of the oxygen evolution reaction and hydrogen evolution reaction are simultaneously progressed within one reactor, so that it is not necessary to switch between the reactions. This causes reheating and cooling of the whole reactor to be unnecessary, thereby eliminating the heat loss of the reactor due to the heating and heat release, thus enhancing energy efficiency.

3. Since the two reactions having different reaction temperatures are simultaneously conducted in the outside and inside of the draft tube within the reactor, a sensible heat released during the cooling of the reactant particles of the fluidized bed can be used to reheat the reactant particles in the hydrogen evolution reaction. That is, in the inside of the draft tube, the reactant particles rise from a lower temperature area toward a high temperature area in the reactor. On the other hand, in the outside of the draft tube, the reactant particles fall from the high temperature area toward the lower temperature area. Such bidirectional flow of the reactant particles generates a large temperature difference between the inside and the outside of the draft tube, thereby transferring the heat from the fluidized bed in the outside of the draft tube toward the fluidized bed in the inside thereof, thus enhancing energy efficiency largely.

4. Since it is not necessary to switch between the reactions, gases released from the inside and outside of the draft tube can be continuously taken out in a constant temperature, thus easily utilizing the waste heat of these gases.

5. Since the whole reactor and the whole reactant particles are not necessary to change their temperatures and the whole gas within the reactor is not necessary to be replaced, the reactions are not stopped or not retarded during the switching of the two reactions, thereby constantly conducting the two reactions, thus enhancing operating efficiency of the reactor.

6. Since it is not required to switch gases introduced into the whole reactor when the two-step reaction is switched and thus the different gases are respectively introduced into the inside and outside of the draft tube on a constant basis, the operation of the reactor can be simplified.

7. Since the hydrogen evolution serving as an exothermic reaction and the oxygen evolution reaction serving as an endothermic reaction are respectively conducted in the inside and outside of the draft tube within the reactor, the reaction heat generated by the hydrogen evolution reaction in the outside of the draft tube can be utilized to heat the gas and particles used for the oxygen evolution reaction because the reaction heat is transferred from the outside to the inside of the draft tube through the walls thereof. Moreover, the oxygen evolution reaction progressing in the inside of the draft tube can use the heat by endothermic reaction, thus enhancing energy conversion efficiency.

BEST MODE FOR CARRYING OUT THE INVENTION

With reference to the accompanying drawings, embodiments of a method and device for producing hydrogen by means of thermochemical water-splitting are described as follows.

First Embodiment

At first, there is described a constitution of the device for producing hydrogen by means of thermochemical water-splitting of the present embodiment.

Figure 1:
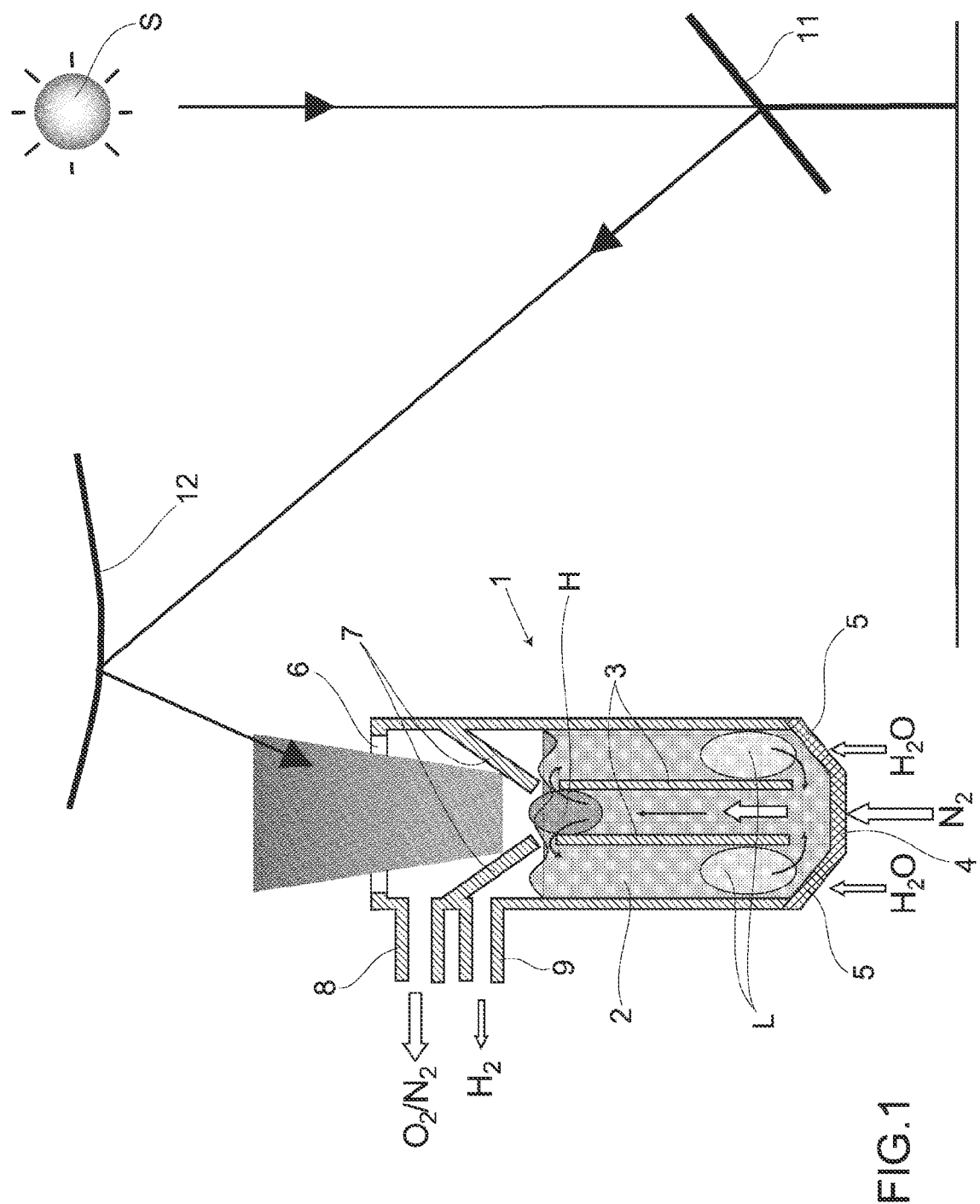
FIG. 1 is a schematic view of a device for producing hydrogen by means of thermochemical water-splitting according to a first embodiment of the present invention.

FIG. 1 shows the device for producing hydrogen by means of thermochemical water-splitting according to a first embodiment of the present invention. In FIG. 1, a numerical reference 1 indicates a reactor made of stainless alloy and inconel alloy, and the reactor 1 stores a fluidized bed 2 made of metal oxide particles.

As for the metal oxide, following metal oxides can be used: an iron oxide such as $Fe_3O_4$, $NiFe_2O_4$ and $CoFe_2O_4$; an iron oxide containing multi-metal; a supported metal oxide such as these iron oxides supported on zirconia; cerium oxide ($CeO_2$); a supported metal oxide such as cerium oxide supported on zirconia, or a zirconia solid solution containing iron ion or cerium ion, for example. As for the zirconia mentioned above, any of monoclinic zirconia, cubic zirconia and tetragonal zirconia can be used. Further, cubic zirconia means stabilized zirconia or partially-stabilized zirconia containing a stabilizer such as yttria, calcia and magnesia as well as containing at least cubic crystal serving as a crystal layer. As for the metal oxide particle, it is preferred to use a fine powder of ferrite expressed in $MFe_2O_4$ (M=Fe, Zn, Mn, Ni, Co, Mg), a fine powder of monoclinic zirconia supporting ferrite expressed in $MFe_2O_4/m-ZrO_2$ (M=Fe, Zn, Mn, Ni, Co, Mg), or a fine powder of yttria-stabilized cubic zirconia supporting ferrite expressed in $MFe_2O_4/YSZ$ (M=Fe, Zn, Mn, Ni, Co, Mg). It is further preferred to use a fine powder of $NiFe_7O_4$ or $NiFe_2O_4/m-ZrO_2$. Furthermore, it is also preferred to use a fine powder of cerium oxide or a fine powder of cerium oxide supported on zirconia. It is preferred that a size of the metal oxide particle is in a range of 100 to 900 μm, and more preferably it a range of 200 to 750 μm.

Moreover, ferrite-supported zirconia can be obtained by following steps: progressing a dissolution and precipitation reaction in which fine powders of zirconia are dispersed in an aqueous solution of Fe(II) chloride and an alkaline aqueous solution such as a sodium hydroxide aqueous solution is added into the aqueous solution, thereby producing colloids of Fe(II) hydroxide and further bubbling the colloids with air to be oxidized, thus dissolving the colloids into the aqueous solution and then precipitating $Fe_3O_4$; and growing the on the dispersed fine powders of zirconia. Or, fine powders of zirconia are dispersed into a Fe(II) chloride aqueous solution, and the Fe(II) chloride aqueous solution is evaporatively dried and then sintered, thereby changing Fe(II) chloride on the zirconia to a metal oxide. The metal oxide is sintered in not lower than 300° C., thereby obtaining ferrite-supported zirconia.

Inside the reactor 1, a cylindrical draft tube 3 that is open in a top and bottom direction thereof is provided. The draft tube 3 is buried into the fluidized bed 2 and arranged in the center portion of the fluidized bed 2. Further, the reactor 1 is respectively provided with dispersion plates 4, 5 on the center portion and the circumference portion at the bottom of the reactor 1. The dispersion plates 4, 5 hold metal oxide particles constituting the fluidized bed 2 within the reactor 1 and are also made of porous material so as to introduce a gas from the bottom of the reactor 1.

The reactor 1 is provided with a quartz window 6 at the upper portion so as to transmit solar light therethrough. Furthermore, above the draft tube 3, a reverse-truncated-cone-shaped gas separator 7 is provided in order to separate gases: one is a gas upwardly released from the inside of the draft tube 3; and the other is a gas upwardly released from the outside of the draft tube 3. Furthermore, on the lateral side of the upper portion of the reactor 1, outlets 8, 9 are provided to take out the gases separated by the gas separator 7.

A numerical reference 11 indicates a ground reflector called heliostat, and a numerical reference 12 indicates a tower reflector provided at a tower not shown in drawings. The ground reflector 11 and the tower reflector 12 constitute a beam-down typed light collecting system. Furthermore, by the beam-down typed light collecting system, solar light S is concentrated and the thus concentrated solar light S is irradiated to the upper central portion of the fluidized bed 2 placed within the reactor 1.

Next, there is described a method for producing hydrogen by means of thermochemical water-splitting of the present embodiment.

Nitrogen is introduced into the inside of the draft tube 3 from the dispersion plate 4. At the same time, water vapor is introduced into the outside of the draft tube 3 from the dispersion plate 5. As for nitrogen, for example, nitrogen having 99.999% purity is used. Here, a gas is not limited to nitrogen and thus may be, for example, argon, as long as the gas to be introduced into the inside of the draft tube 3 is a low-oxygen partial pressure gas. Furthermore, a mixed gas with water vapor and nitrogen may be available for example, as long as the gas to be introduced into the outside of the draft tube 3 contains water vapor.

The fluidized bed 2 is circulated in the inside and outside of the draft tube 3 by making the flow rate of nitrogen in the inside of the draft tube 3 larger than the flow rate of water vapor in the outside thereof. In short, this generates an internally circulating fluid where the fluidized bed 2 rises in the area of the inside of the draft tube 3 and the fluidized bed 2 drops in the area between the reactor 1 and the outside of the draft tube 3.

After that, the upper central portion of the fluidized bed 2 is irradiated through the window 6 with the solar light S concentrated by the ground reflector 11 and the tower reflector 12, thereby heating the fluidized bed 2. In the vicinity of the upper central portion of the fluidized bed 2 irradiated with the solar light S, a high temperature area H is formed whose temperature is not lower than 1400° C. At the high temperature area H, a thermal reduction reaction is progressed, thereby releasing oxygen from the metal oxide particles. The released oxygen passes through above the gas separator 7 and is taken out from the outlet 8.

For example, the equation of the thermal reduction reaction is as follows when $NiFe_2O_4$ is used as metal oxide.

$$NiFe_2O_4 \rightarrow 3Ni_{1/3}Fe_{2/3}O+(½)O_2$$

Moreover, for example, the equation of the thermal reduction reaction is as follows when $CeO_2$ is used as metal oxide.

$$CeO_2 \rightarrow CeO_{2-x}+(x/2)O_2 (0<x\leq 0.5)$$

The reduced metal oxide particles are transferred to the lower portion of the reactor 1 through the area between the reactor 1 and the outside of the draft tube 3 by the internally circulating fluid. During the transfer of the metal oxide particles to the lower portion of the reactor 1, the temperature of the metal oxide particles becomes lower. As a result, there is formed a lower temperature area L whose temperature is not higher than 1400° C., preferably not higher than 1200° C. At the lower temperature area L, a thermochemical water-splitting reaction is progressed. Therefore, the metal oxide particles reduced by the thermal reduction reaction are oxidized and thus brought back to the original condition of the metal oxide particles. At the same time, hydrogen is generated. The generated hydrogen passes through below the gas separator 7 and is taken out from the outlet 9.

For example, the equation of the thermochemical water-splitting reaction is as follows when $NiFe_2O_4$ is used as the metal oxide.

$$3Ni_{1/3}Fe_{2/3}O+H_2O \rightarrow NiFe_2O_4+H_2$$

Moreover, for example, the equation of the thermochemical water-splitting reaction is as follows when $CeO_2$ is used as the metal oxide.

$$CeO_{2-x}+xH_2O \rightarrow CeO_2+xH_2 (0<x\leq 0.5)$$

As described above, the method for producing hydrogen by means of thermochemical water-splitting of the present embodiment is that the two reactions are simultaneously progressed while the fluidized bed 2 made of metal oxide particles is circulated within the reactor 1. One reaction is a thermal reduction reaction serving as the oxygen evolution reaction which releases oxygen from the metal oxide by heating apart of the fluidized bed 2 by solar light S under nitrogen atmosphere serving as a low-oxygen partial pressure gas. The other reaction is the thermochemical water-splitting reaction serving as the hydrogen evolution reaction which releases hydrogen by allowing the metal oxide with oxygen having been released therefrom to come into contact with water vapor. Therefore, since the two reactions of the oxygen evolution reaction and the hydrogen evolution reaction are simultaneously progressed, a conventional switching between the oxygen evolution reaction and the hydrogen evolution reaction is not necessary. In this way, it is not required to either switch the low-oxygen partial pressure and water vapor or switch the increment and decrement of the incident energy of the concentrated solar light, thereby constantly using a full of solar heat obtained by the beam-down typed light collecting system, thus enhancing usage efficiency of the solar energy.

Further, the two reactions of the oxygen evolution reaction and the hydrogen evolution reaction are progressed at the same time in different areas within one reactor, so that it is not required to switch between the reactions. Therefore, energy efficiency is enhanced because unnecessity of cooling and reheating the reactor leads to no energy loss of the reactor. Furthermore, since the oxygen evolution reaction is conducted in not lower than 1400° C. in the inside of the draft tube within the reactor and the thermochemical water-splitting reaction is conducted in not higher than 1400° C. in the outside of the draft tube, the sensible heat is released when the reactant particles in the internally circulating fluidized bed cool down in the outside of the draft tube, thereby allowing the sensible heat to be used to reheat the reactant particles in the inside of the draft tube. Moreover, the temperature of the whole reactor and whole reactant particles are not necessary to be changed, and the whole gas to be introduced into the reactor is not necessary to be replaced, thereby not stopping or not retarding the reactions while changing the temperature and exchanging the gas, thus constantly conducting the two reactions at the same time. In this way, operating efficiency of the reactor is enhanced. In addition, since the whole gas to be introduced into the reactor is not necessary to be replaced, and the different gases are respectively introduced into the inside and outside of the draft tube on a constant basis, an operation of the reactor is simplified. Additionally, since the hydrogen evolution serving as an exothermic reaction and the oxygen evolution reaction serving as an endothermic reaction are respectively conducted in the inside and outside of the draft tube within the reactor, the reaction heat generated by the exothermic reaction can be utilized as a heat source of the endothermic reaction. Besides, both the oxygen-containing gas and the hydrogen-containing gas are continuously taken out in a constant temperature, thereby easily utilizing a waste heat of these gases.

The device for producing hydrogen by means of thermochemical water-splitting of the present embodiment includes: the solar reactor 1 storing the fluidized bed 2 made of the metal oxide particles; and the ground reflector 11 and the tower reflector 12 serving as a solar light concentration means concentrating the solar light S and irradiating the solar light S onto the upper central portion of the fluidized bed 2 stored within the reactor 1. The reactor 1 includes: the cylindrical draft tube 3 that is open in a top and bottom direction, buried into the fluidized bed 2, and arranged in the center portion thereof; the dispersion plate 4 serving as a low-oxygen partial pressure gas introduction means which introduces the low-oxygen partial pressure gas into the inside of the draft tube 3 from the lower portion of the reactor; the dispersion plate 5 serving as a water vapor introduction means which introduces the water vapor into the outside of the draft tube 3 from the lower portion of the reactor; and the gas separator 7 serving as a gas separation means which separates the gas upwardly released from the inside of the draft tube 3 and the gas upwardly released from the outside of the draft tube 3.

As described above, while the solar light S is concentrated and irradiated to the upper central portion of the fluidized bed 2, the low-oxygen partial pressure gas and the water vapor are respectively introduced into the inside and outside of the draft tube 3 at the same time. While the fluidized bed 2 is circulated by making the flow rate of the low-oxygen partial pressure gas larger than that of the water vapor, the oxygen evolution reaction is progressed at the upper central portion of the fluidized bed 2 and the hydrogen evolution reaction is also progressed in the outside of the draft tube 3 at the same time, thereby simultaneously producing oxygen and hydrogen. Further, the gas separator 7 prevents the oxygen-containing gas from mixing with the hydrogen-containing gas, thereby separately taking out the oxygen-containing gas and the hydrogen-containing gas.

Moreover, the heat is transferred toward the fluidized bed 2 in the area of the inside of the draft tube 3 through the draft tube 3 from the fluidized bed 2 in the area between the solar reactor 1 and the outside of the draft tube 3. In order to smoothly progress the heat transfer, a sufficient temperature difference is required to make the temperature of the fluidized bed 2 in the area of the inside of the draft tube 3 lower than the temperature of the fluidized bed 2 in the area of the outside thereof. According to the fluidized bed 2 of the present embodiment, since the low-oxygen partial pressure gas and the water vapor are respectively introduced into the inside and outside of the draft tube 3 at the same time, and the fluidized bed 2 is circulated in bidirectional flow through the draft tube 3 within the reactor 1 by increasing the flow rate of the low-oxygen partial pressure gas more than the flow rate of the water vapor, the heat can be transferred toward the fluidized bed 2 in the area of the inside of the draft tube 3 from the fluidized bed 2 in the area of the outside thereof by generating a large temperature difference between the fluidized bed 2 in the inside of the draft tube 3 and the fluidized bed 2 in the outside thereof. That is, the sensible heat of the reactant particles of the fluidized bed in the middle of the way from the higher temperature area H to the lower temperature area L is taken out by the reactant particles of the fluidized bed in the middle of the way from the lower temperature area L to the higher temperature area. H. Moreover, the reactant particles of the fluidized bed in the middle of the way from the higher temperature area H to the lower temperature area L generate heat by the hydrogen evolution reaction. Therefore, the reaction heat is transferred to the reactant particles of the fluidized bed in the middle of the way from the lower temperature area L to the higher temperature area H, thereby utilizing the heat as the heat source of the oxygen evolution reaction serving as an endothermic reaction. Additionally, it takes a time to move the reactant particles from the higher temperature area H to the lower temperature area L, thereby transferring a large amount of heat to the reactant particles moving from the lower temperature area L to the higher temperature area H, thus enhancing the energy efficiency.

Second Embodiment

Figure 2:
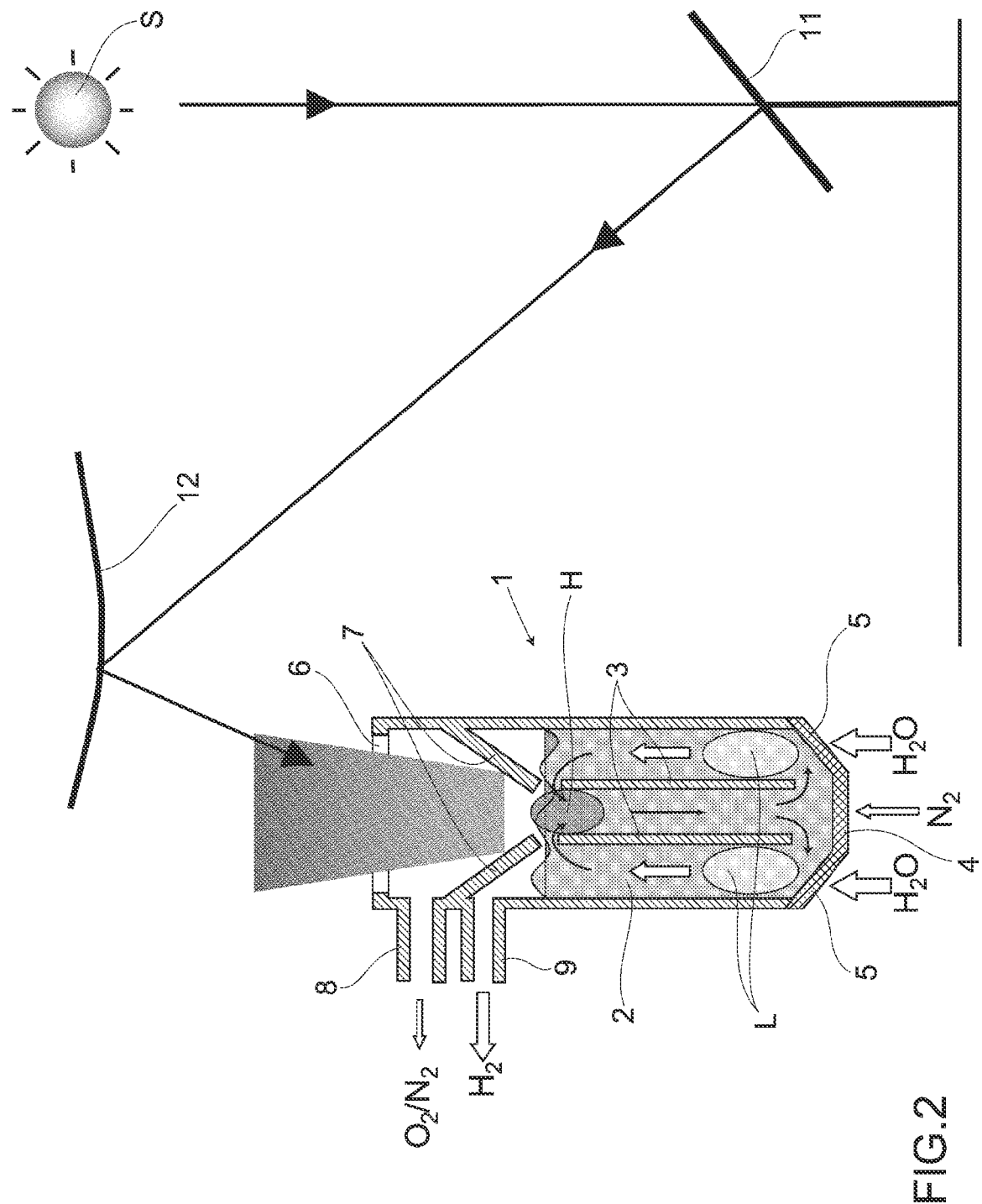
FIG. 2 is a schematic view of a device for producing hydrogen by means of thermochemical water-splitting according to another embodiment of the present invention.

FIG. 2 shows the device for producing hydrogen by means of thermochemical water-splitting according to another embodiment of the present invention. Additionally, the same reference numbers are given to the same parts of the first embodiment, and their explanations are omitted.

According to the present embodiment, the fluidized bed 2 is circulated in the inside and outside of the draft tube 3 by making the flow rate of nitrogen in the inside of the draft tube 3 lower than the flow rate of water vapor in the outside thereof. That is, in contradiction to the first embodiment, the fluidized bed 2 falls in the area of the inside of the draft tube 3 and rises in the area between the solar reactor 1 and the outside thereof, thereby generating the internally circulating fluid.

In this way, in the case of generating the internally circulating fluid in the opposite direction of the first embodiment, as it is for the first embodiment, the thermal reduction reaction is progressed in the high temperature area in the vicinity of the upper central portion of the fluidized bed 2 where the solar light S is irradiated. The released oxygen passes through above the gas separator 7 and is taken out from the outlet 8. Further, the thermochemical water-splitting reaction is progressed in the lower temperature area L formed in the lower portion of the fluidized bed 2. The released hydrogen passes through below gas separator 7 and is taken out from the outlet 9. Furthermore, a heat is transferred from the fluidized bed 2 in the area of the inside of the draft tube 3 through the draft tube 3 toward the fluidized bed 2 in the area between the solar reactor 1 and the outside of the draft tube 3. In order to smoothly progress the heat transfer, a sufficient temperature difference is required to make the temperature of the fluidized bed 2 in the area of the outside of the draft tube 3 lower than the temperature of the fluidized bed 2 in the area of the inside thereof. According to the fluidized bed 2 of the present embodiment, since the low-oxygen partial pressure gas and the water vapor are respectively introduced into the inside and outside of the draft tube 3 at the same time, and the fluidized bed 2 is circulated through the draft tube 3 within the solar reactor 1 by decreasing the flow rate of the low-oxygen partial pressure gas less than the flow rate of the water vapor, the heat is transferred toward the fluidized bed 2 in the area of the outside of the draft tube 3 from the fluidized bed 2 in the area of the inside thereof by generating the large temperature difference between the fluidized bed 2 in the inside of the draft tube 3 and the fluidized bed 2 in the outside thereof. That is, the sensible heat of the reactant particles of the fluidized bed in the middle of the way from the higher temperature area H to the lower temperature area L is taken out by the reactant particles of the fluidized bed in the middle of the way from the lower temperature area L to the higher temperature area H. Additionally, it takes a time to move the reactant particles from the higher temperature area H to the lower temperature area L, thereby transferring a large amount of heat to the reactant particles moving from the lower temperature area L to the higher temperature area H, thus enhancing the energy efficiency.

Third Embodiment

The thermal reduction reaction and the thermochemical water-splitting reaction were simultaneously conducted for sixty minutes by using 142 g fine particles of $NiFe_2O_4$/m-$ZrO_2$ whose particle sizes were in the range of 212 to 710 μm serving as the metal oxide constituting the fluidized bed 2. The inner diameter of the reactor to be used was 45 mm, and the inner diameter of the draft tube 3 was 18 mm. The outer diameter of the draft tube 3 was 21 mm. Three 6 kW-xenon lamps were used to irradiate 1.69 kW-light instead of the solar light S. Nitrogen gas having 99.999% purity was flowed in the inside of the draft tube 3 at 240 ml/min as a flow rate and 105.7 cm/min as a linear flow rate. A mixture gas with water vapor and nitrogen was flowed in the outside of the draft tube 3 at 240 ml/min as a flow rate and 19.3 μm/min as a linear flow rate.

Figure 3:
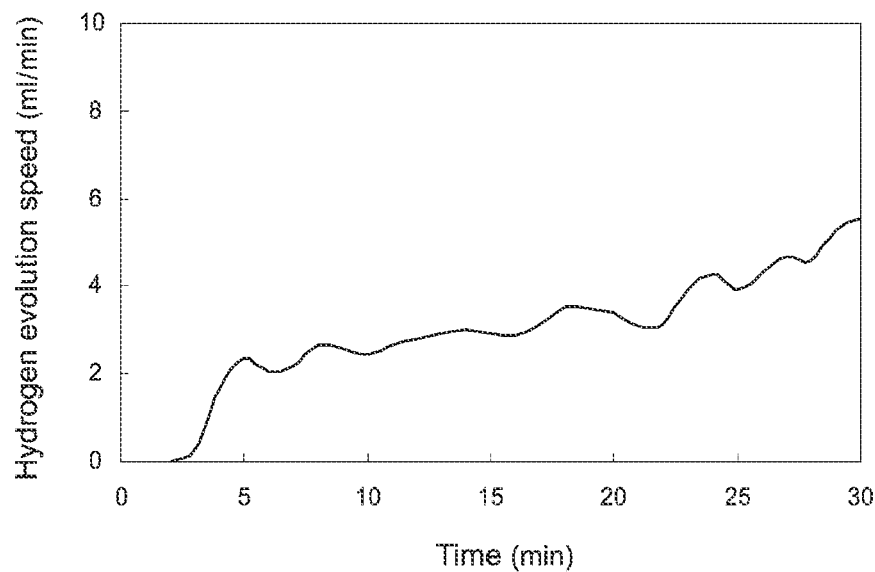
FIG. 3 is a graph showing a time variation of hydrogen evolution speed according to a third embodiment.

FIG. 3 shows a time variation of hydrogen evolution speed during the experiment of the present embodiment. The total amount of evolved hydrogen was 143.3 ml (1 atmosphere, 25° C.). After the reaction, the fluidized bed 2 was not sintered and coagulated, but it maintained powdered form. As a result, when the fine particles of $NiFe_2O_4$/m-$ZrO_2$ were used as the fluidized bed 2, it was found that an extension of reaction time led to an increment of the amount of evolved hydrogen.

Fourth Embodiment

The thermal reduction reaction and the thermochemical water-splitting reaction were simultaneously conducted for sixty minutes by using 212 g fine particles of $NiFe_2O_4$ whose particle sizes were in the range of 212 to 710 μm serving as the metal oxide constituting the fluidized bed 2. The inner diameter of the solar reactor to be used was 45 mm, and the inner diameter of the draft tube 3 was 18 mm. The outer diameter of the draft tube 3 was 21 mm. Three 6 kW-xenon lamps were used to irradiate 1.69 kW-light instead of the solar light S. 99.999% purity nitrogen gas was flowed in the inside of the draft tube 3 at 240 ml/min as a flow rate and 105.7 cm/min as a linear flow rate. A mixture gas with water vapor and nitrogen was flowed in the outside of the draft tube 3 at 240 ml/min as a flow rate and 19.3 cm/min as a linear flow rate.

Figure 4:
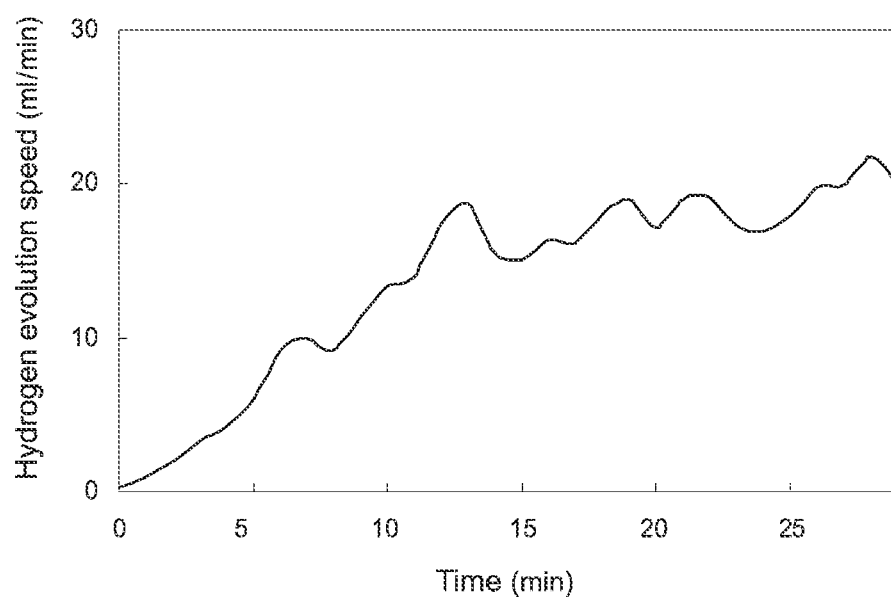
FIG. 4 is a graph showing a time variation of hydrogen evolution speed according to a forth embodiment.

FIG. 4 shows a time variation of hydrogen evolution speed during the experiment of the present embodiment. The total amount of evolved hydrogen was 600.6 ml (1 atmosphere, 25° C.). After the reaction, the fluidized bed 2 was not sintered and coagulated, but it maintained powdered form. As a result, when fine particles of non-supported $NiFe_2O_4$ were used for the fluidized bed 2, it was found that an extension of reaction time led to an increment of the amount of evolved hydrogen.

Fifth Embodiment

Figure 5:
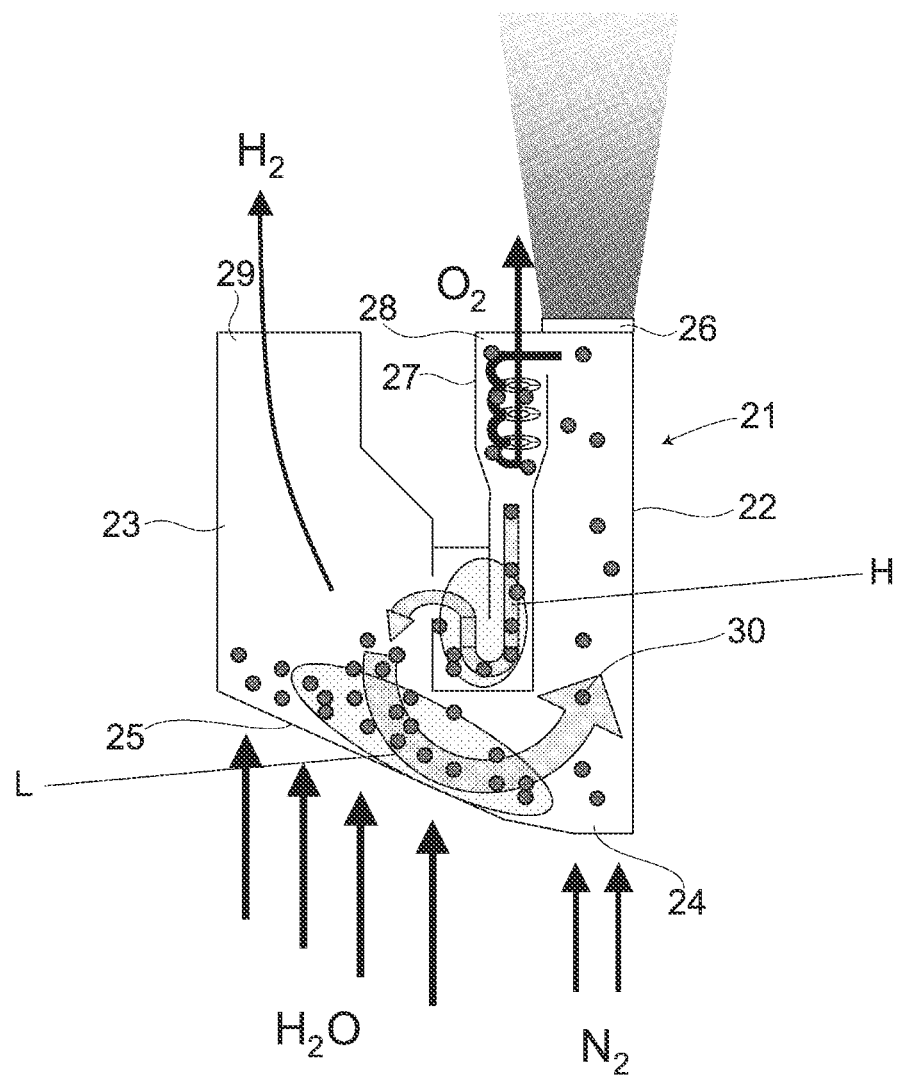
FIG. 5 is a schematic view of a device for producing hydrogen by means of thermochemical water-splitting according to yet another embodiment of the present invention.

FIG. 5 shows the device for producing hydrogen by means of thermochemical water-splitting according to yet another embodiment of the present invention. Additionally, the ground reflector 11 and tower reflector 12 which serve as a solar light concentration means are the same as the first embodiment, so that the ground reflector 11 and the tower reflector 12 are not shown.

According to the present embodiment, a reactor 21 includes a thermal reduction reactor 22 conducting a thermal reduction reaction therein and a thermochemical water-splitting reactor 23 conducting a thermochemical water-splitting reaction therein. The lower portion of the thermal reduction reactor 22 is connected with the lower portion of the thermochemical water-splitting reactor 23, and thus the reactor 21 is constituted so as to flow a fluidized bed 30 between the thermal reduction reactor 22 and the thermochemical water-splitting reactor 23.

The thermal reduction reactor 22 is provided with a dispersion plate 24 at the bottom thereof for introducing nitrogen, and the thermochemical water-splitting reactor 23 is provided with a dispersion plate 25 at the bottom thereof for introducing water vapor. Further, the thermal reduction reactor 22 is provided with a quartz window 26 at the upper portion so as to transmit concentrated solar light S. In the vicinity of the window 26, a cyclone 27 is provided to separate oxygen produced by thermal reduction reaction. Above the cyclone 27 of the thermal reduction reactor 22, an outlet 28 for an oxygen-containing gas generated by the thermal reduction reaction is provided. At the upper portion of the thermochemical water-splitting reactor 23, an outlet 29 for a hydrogen-containing gas generated by the thermochemical water-splitting reaction is provided.

According to the device for producing hydrogen by means of thermochemical water-splitting of the present embodiment, nitrogen is introduced from the dispersion plate 24, and water vapor is introduced from the dispersion plate 25 at the same time. In this way, the fluidized bed 30 is circulated between the thermal reduction reactor 22 and the thermochemical water-splitting reactor 23 by making the flow rate of nitrogen larger than the flow rate of water vapor. That is, the fluidized bed 30 rises in the thermal reduction reactor 22 and falls in the thermochemical water-splitting reactor 23, thereby generating an internal fluid.

Next, the fluidized bed 30 is irradiated with the concentrated solar light S through the window 26, so that the fluidized bed 30 is heated. In the vicinity of the fluidized bed 30 where the solar light S is irradiated, the thermal reduction reaction is progressed, thereby releasing oxygen from the metal oxide particles. The released oxygen is separated from the fluidized bed 30 by the cyclone 27 and then taken out from the outlet 28.

The reduced metal oxide particles are transferred through the cyclone 27 to the thermochemical water-splitting reactor 23. The metal oxide particles cool down during the transfer thereof to the thermochemical water-splitting reactor 23. In the lower portion of thermochemical water-splitting reactor 23, the thermochemical water-splitting reaction is progressed, and the reduced metal oxide particles are oxidized by the water-splitting reaction, thereby restoring an original condition of the metal oxide particles and simultaneously generating hydrogen. The generated hydrogen is taken out from the outlet 29.

Furthermore, the reduced metal oxide particles are transferred to the thermochemical water-splitting reactor 23 below the cyclone 27. At the time, below the cyclone 27, a heat is transferred toward the fluidized bed 30 within the thermochemical water-splitting reactor 23 or the thermal reduction reactor 22. In order to smoothly progress the heat transfer, a sufficient temperature difference is required to make the temperature of the fluidized bed 30 in the thermochemical water-splitting reactor 23 or in the thermal reduction reactor 22 lower than the temperature of the reactant particles of the fluidized bed 30 in the area below the cyclone 27. The reactant particles of the fluidized bed 30 in the area below the cyclone 27 can obtain sufficiently high temperature because the thermally reduced reactant particles are deposited thereon. On the other hand, the fluidized bed 30 in the thermochemical water-splitting reactor 23 is exposed to the flow of water vapor, and the fluidized bed 30 in the thermal reduction reactor 22 is exposed to the flow of nitrogen, thereby generating a large temperature difference, thus transferring the heat from the area below the cyclone 27 toward the fluidized bed 30 in the thermochemical water-splitting reactor 23 or in the thermal reduction reactor 22. That is, the sensible heat of the fluidized bed 30 in the area below the cyclone 27 is transferred from the higher temperature area H toward the lower temperature area L, thereby taking out the heat. Moreover, the reactant particles of the fluidized bed 30 transferred to the lower temperature area L generate the heat by the hydrogen evolution reaction. Therefore, the reaction heat is transferred to the reactant particles of the fluidized bed 30 in the thermal reduction reactor 22, thereby utilizing the heat as the heat source of the oxygen evolution reaction serving as an endothermic reaction, thus enhancing the energy efficiency.

As described above, the device for producing hydrogen by means of thermochemical water-splitting of the present embodiment includes: the reactor 21 storing the fluidized bed 30 made of the metal oxide particles; the ground reflector 11 and the tower reflector 12 which are served as a solar light concentration means concentrating the solar light S and irradiating the solar light S onto the upper central portion of the fluidized bed 30 stored within the reactor 21; the dispersion plate 24 serving as a low-oxygen partial pressure gas introduction means which introduces the low-oxygen partial pressure gas into the fluidized bed 30; and the dispersion plate 25 serving as a water vapor introduction means which introduces the water vapor into the fluidized bed 30. The device of the present embodiment can simultaneously produce oxygen and hydrogen by the following steps: concentrating the solar light S and irradiating the solar light S onto the upper surface of the fluidized bed 30; and progressing the oxygen evolution reaction on the upper surface of the fluidized bed 30 and the hydrogen evolution reaction in the lower portion of tire fluidized bed 30 at the same time while the fluidized bed 30 is circulated in the reactor.

Sixth Embodiment

Figure 6:
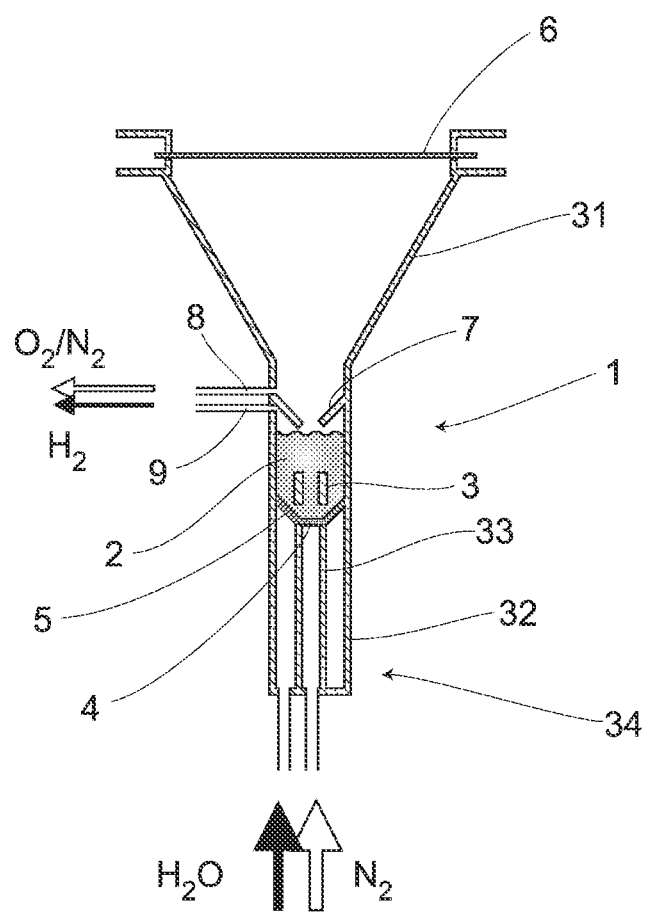
FIG. 6 is a schematic view of a device for producing hydrogen by means of thermochemical water-splitting according to a modification of the present invention.

FIG. 6 shows the device for producing hydrogen by means of thermochemical water-splitting according to a modification of the present invention. Additionally, the same reference numbers are given to the same parts of the first embodiment, and their explanations are omitted. Furthermore, the ground reflector 11 and the tower reflector 12 which serve as a solar light concentration means are the same as the first embodiment, so that the ground reflector 11 and the tower reflector 12 are not shown.

According to the present embodiment, a conic portion 31 having a reverse-truncated-cone shape is provided continuously from the upper end of the reactor 1. The conic portion 31 has the diameter of the lower end same as the diameter of the reactor 1 and is formed such that the diameter gradually increases from the bottom to the top. The conic portion 31 is provided with the window 6 on the upper portion.

Meanwhile, a double pipe 34 having an external pipe 32 and an internal pipe 33 is provided continuously from the lower end of the reactor 1. The external pipe 32 has the same diameter as the diameter of the reactor 1, and water vapor is supplied to the dispersion plate 5 through a space between the external pipe 32 and the internal pipe 33. The low-oxygen partial pressure gas is supplied to the dispersion plate 4 through the internal pipe 33.

According to the constitution described above, since the conic portion 31 is formed such that the diameter gradually increases from the bottom to the top, solar light can be easily introduced into the reactor 1 from various directions. Also, since the conic portion 31 is formed such that the diameter gradually increases from the bottom to the top, although the flow rate of the low-oxygen partial pressure gas supplied from the lower portion of the reactor increases, the linear flow rate of the low-oxygen partial pressure gas becomes lower at the time when the low-oxygen partial pressure gas reaches the conic portion 31. Therefore, the fluidized bed 2 is prevented from being stirred up.

Seventh Embodiment

The device for producing hydrogen shown in FIG. 6 does not include the gas separator 7, outlets 8, 9 but includes a sampling opening provided on the upper portion of the conic portion 31. The experiment was conducted by using this device. Additionally, thermal insulator was placed on whole surroundings but the upper surface of the device for producing hydrogen.

The thermal reduction reaction and the thermochemical water-splitting reaction were simultaneously conducted by using 271 g fine particles of $CeO_2$ whose particle sizes were in the range of 212 to 710 μm serving as metal oxide constituting the fluidized bed 2. The inner diameter of the reactor to be used was 54 mm, and the inner diameter of the draft tube 3 was 18 mm. The outer diameter of the draft tube 3 was 21 mm. After the fluidized bed 2 was preheated at 800° C., three 7 kW-xenon lamps were used to irradiate 2.83 kW-light instead of the solar light S onto the upper surface of the fluidized bed 2. After starting the irradiation, preheat of the fluidized bed 2 stopped, and the thermal reduction reaction and the thermochemical water-splitting reaction were conducted by only light irradiation heating. Nitrogen gas having 99.999% purity was flowed in the inside of the draft tube 3 at 3,000 ml/min as a flow rate. At the same time, a mixture gas with water vapor and nitrogen was flowed in the outside of the draft tube 3 at 3,060 ml/min as a flow rate (water vapor 2,380 ml/min (under liquid condition 1.90 ml/min), nitrogen 680 ml/min). The linear flow rate of the gas in the inside of the draft tube 3 was 1,321 cm/min, and the linear flow rate of the gas in the outside of the draft tube 3 was 157 cm/min. After that, the gas from the sampling opening provided above the conic portion 31 was cooled down by cooling water, and the hydrogen evolution speed was measured with a gas chromatography.

Figure 7:
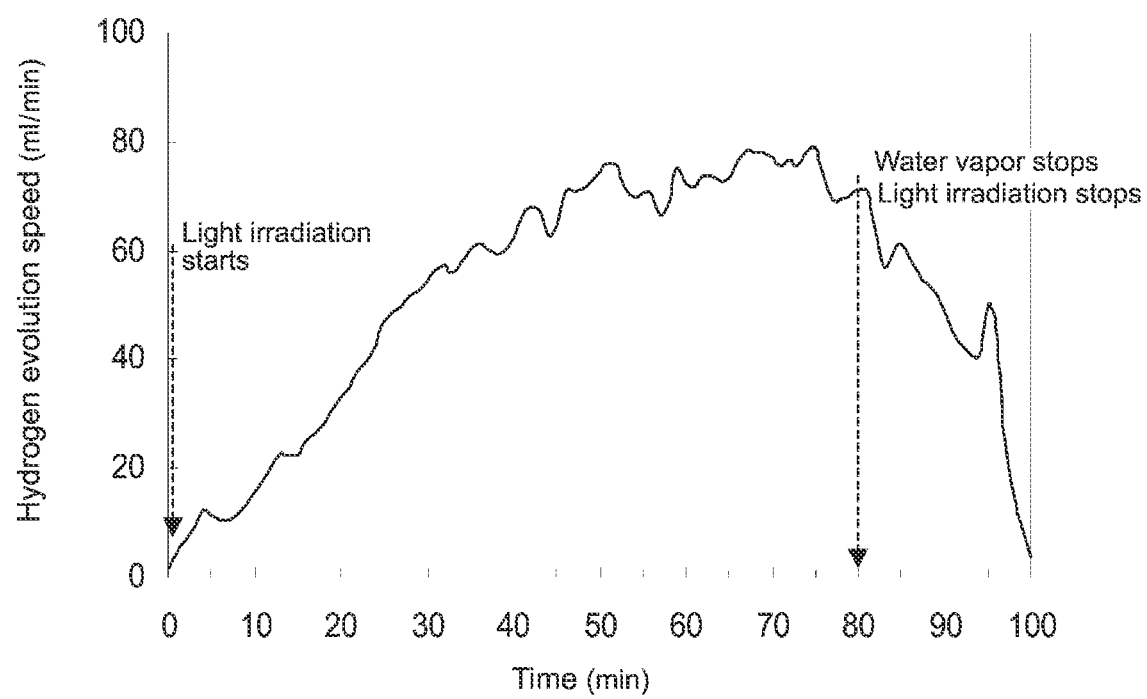
FIG. 7 is a graph showing a time variation of hydrogen evolution speed according to a seventh embodiment.
Figure 8:
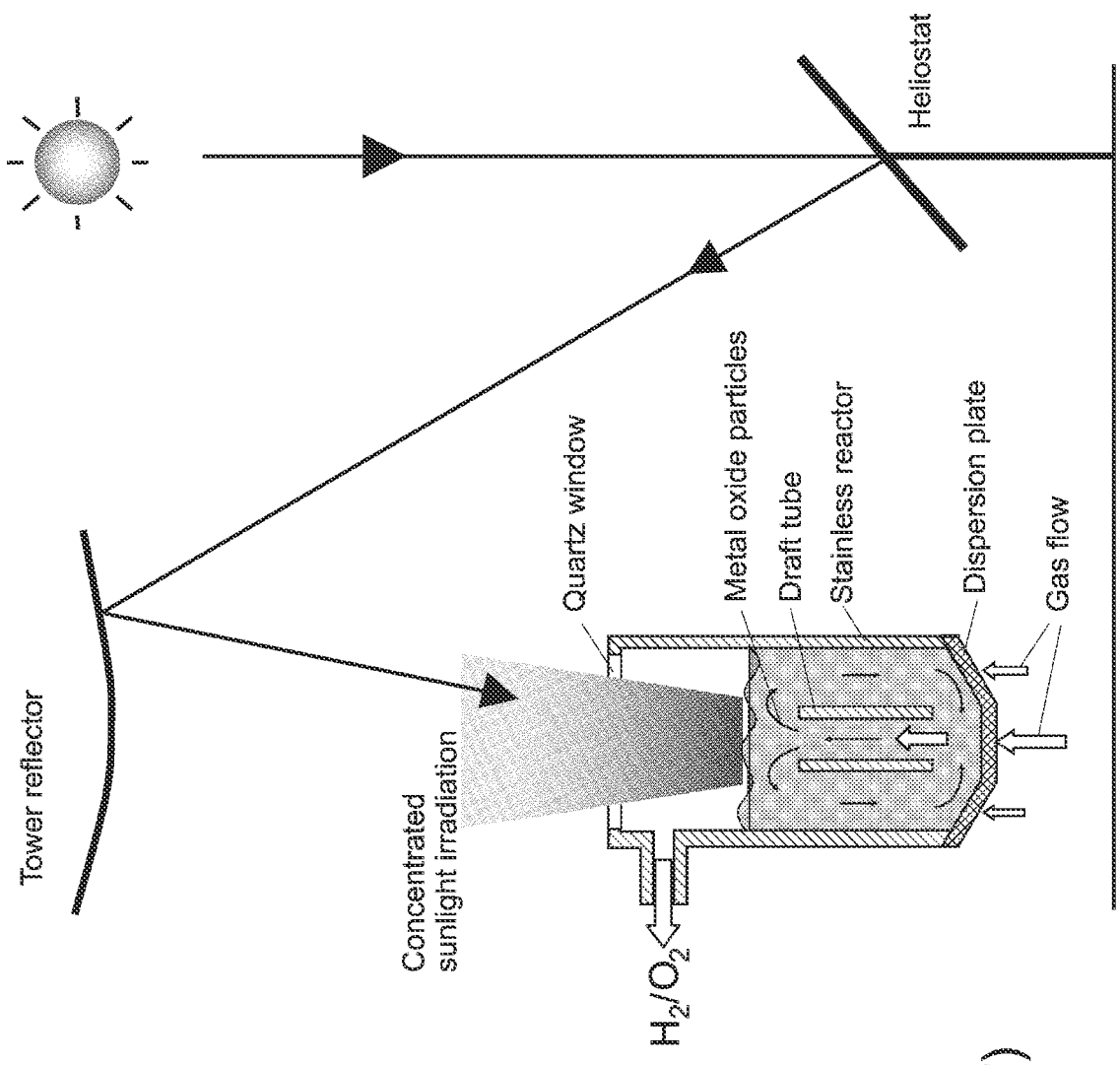
FIG. 8 is a schematic view of an example of a device for producing hydrogen by means of thermochemical water-splitting according to the conventional art.

FIG. 7 shows a time variation of hydrogen evolution speed during this experiment. It was recorded that the average hydrogen evolution speed was 62.3 ml/min (1 atmosphere, 25° C. and the maximum hydrogen evolution speed was 78.8 ml/min (1 atmosphere, 25° C.). The total amount of hydrogen evolved by light irradiation for 80 minutes was 4,975 ml (1 atmosphere, 25° C.). The amount of evolved hydrogen per 1 g of $CeO_2$ was 18.4 ml (1 atmosphere, 25° C.). After the reaction, the fluidized bed 2 was not sintered and coagulated, but it maintained powdered form, and the closer to the upper portion of the reactor 1, the more grayish the reduction phase of $CeO_{2-x}$ became. As a result, when fine particles of $CeO_2$ were used, it was found that an extension of reaction time led to an increment of the amount of hydrogen evolved.

DESCRIPTION OF THE REFERENCE NUMERAL 1, 21 reactor
2, 30 fluidized bed
3 draft tube
4, 24 dispersion plate (low-oxygen partial pressure gas introduction means)
5, 25 dispersion plate (water vapor introduction means)
6 window
7 gas separator (gas separation means)
11 ground reflector (solar light concentration means)
12 tower reflector (solar light concentration means)
S solar light

The invention claimed is:
1. A method for producing hydrogen by means of thermochemical water-splitting comprising:
  simultaneously progressing an oxygen evolution reaction and a hydrogen evolution reaction while a fluidized bed comprising particles of a metal oxide is circulated within a solar reactor, by using a device for producing hydrogen by means of thermochemical water-splitting,
  wherein the device comprises:
    the solar reactor storing the fluidized bed comprising the particles of the metal oxide, the solar reactor comprising:
      a cylindrical draft tube that is open in a top and bottom direction, buried into the fluidized bed, and arrange in a center portion of the fluidized bed;
      a low-oxygen partial pressure gas introduction means introducing a low-oxygen partial pressure gas into an inside of the draft tube from a lower portion of the draft tube;
      a water vapor introduction means introducing water vapor into an outside of the draft tube from the lower portion of the draft tube; and
      a gas separation means separating a gas upwardly released from the inside of the draft tube and a gas upwardly released from the outside of the draft tube;

a solar light concentration means concentrating and irradiating solar tight onto the fluidized bed stored within the solar reactor; and wherein the oxygen evolution reaction releases oxygen from the metal oxide by heating a part of the fluidized bed by solar light under a low-oxygen partial pressure gas atmosphere and the hydrogen evolution reaction releases hydrogen by allowing the metal oxide with oxygen having been released therefrom to come into contact with water vapor.

2. A method for producing hydrogen by means of thermochemical water-splitting comprising:

simultaneously progressing an oxygen evolution reaction and a hydrogen evolution reaction while a fluidized bed comprising particles of a metal oxide is emulated within a solar reactor, by using a device for producing hydrogen by means of thermochemical water-splitting, wherein the devise comprises:

the solar reactor storing the fluidized bed comprising the particles of the metal oxide, the solar reactor comprising:

a cylindrical draft tube that is open in a top and bottom direction, buried into the fluidized bed, and arranged in a center portion of the fluidized bed;

a low-oxygen partial pressure gas introduction means introducing a low-oxygen partial pressure gas into an inside of the draft tube from a lower portion of the draft tube;

a water vapor introduction means introducing water vapor into an outside of the draft tube from the lower portion of the draft tube; and a gas separation means separating a gas upwardly released from the inside of the draft tube and a gas upwardly released from the outside of the draft tube;

a solar light concentration means concentrating and irradiating solar light onto the fluidized bed stored within the solar reactor; and wherein the oxygen evolution reaction releases oxygen from the metal oxide by heating a part of the fluidized bed by solar light to not lower than 1,400° C. under a low-oxygen partial pressure gas atmosphere and the hydrogen evolution reaction releases hydrogen by allowing the metal oxide with oxygen having been released therefrom to come into contact with water vapor in a temperature of not higher than 1,400° C.

3. The method for producing hydrogen by means of thermochemical water-splitting according to claim 2, wherein the metal oxide is ferrite or ferrite-supported zirconia.

4. The method for producing hydrogen by means of thermochemical water-splitting according to claim 3, wherein the zirconia is any of monoclinic zirconia, cubic zirconia and tetragonal zirconia, and the cubic zirconia contains any of yttria, calcia and magnesia as a stabilizer.

5. The method for producing hydrogen by means of thermochemical water-splitting according to claim 2, wherein the metal oxide is nickel ferrite or nickel-ferrite-supported monoclinic zirconia.

6. The method for producing hydrogen by means of thermochemical water-splitting according to claim 5, wherein particle sizes of the metal oxide particles are in a range of 200 to 750 μm.

7. The method for producing hydrogen by means of thermochemical water-splitting according to claim 2, wherein the metal oxide is cerium oxide or cerium-oxide-supported zirconia.

8. The method for producing hydrogen by means of thermochemical water-splitting according to claim 7, wherein particle sizes of the metal oxide particles are in a range of 200 to 750 μm.

9. The method for producing hydrogen by means of thermochemical water-splitting according to claim 2, wherein the low-oxygen partial pressure gas is nitrogen or argon.

* * * * *